R. H. ALDRICH.
VALVE SEAT.
APPLICATION FILED DEC. 12, 1916.
1,235,409.
Patented July 31, 1917.
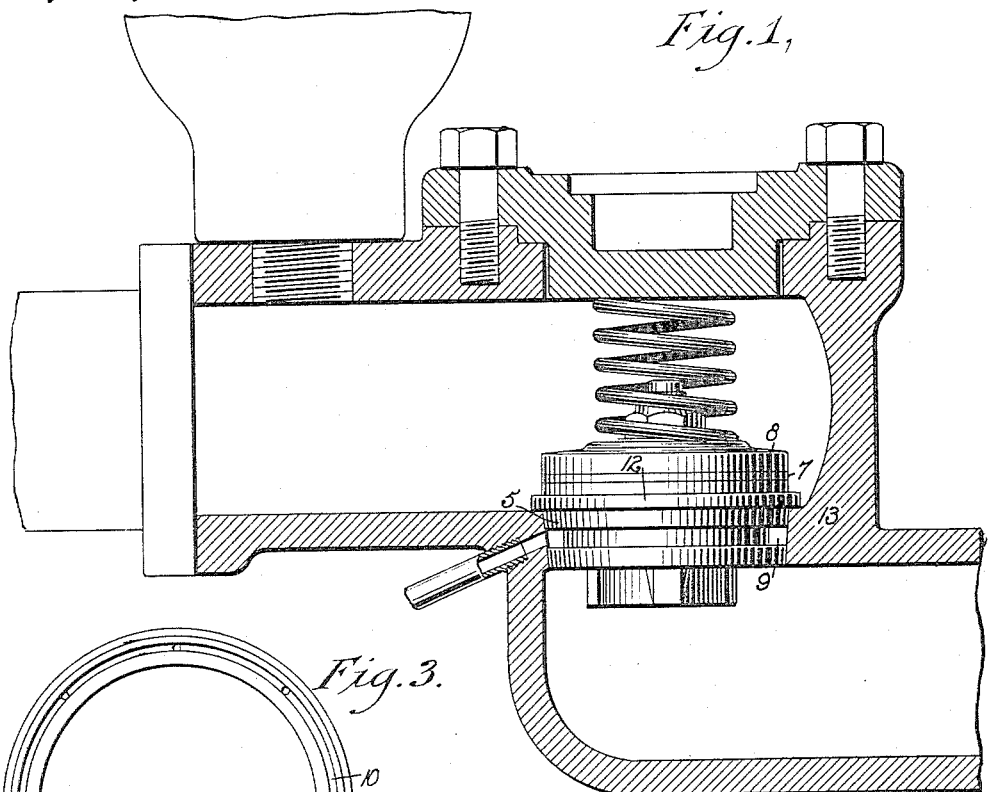
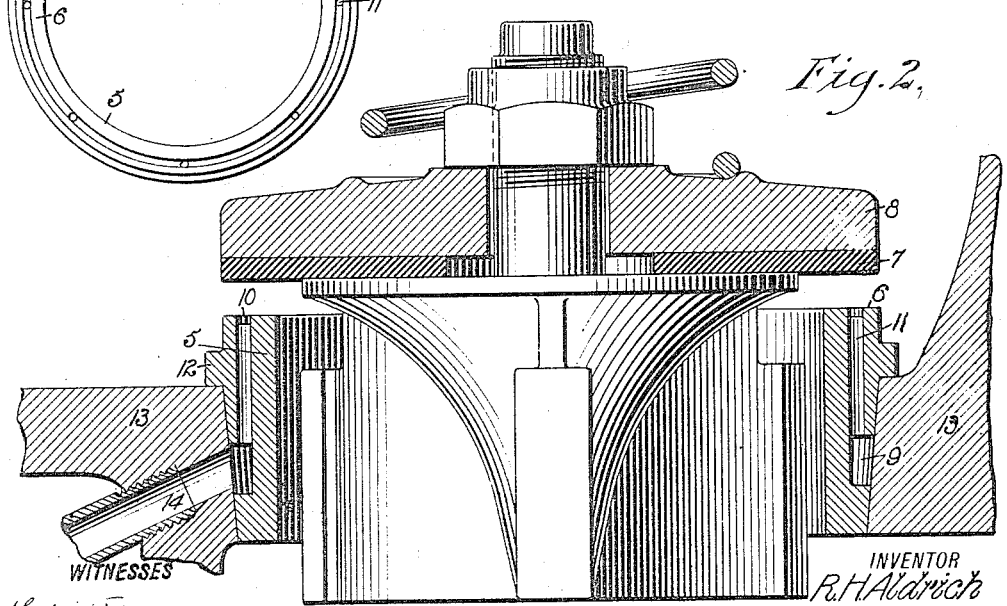

UNITED STATES PATENT OFFICE.

ROSCOE H. ALDRICH, OF ALLENTOWN, PENNSYLVANIA.

VALVE-SEAT.

1,235,409.

Specification of Letters Patent.

Patented July 31, 1917.

Application filed December 12, 1916. Serial No. 136,461.

*To all whom it may concern:*

Be it known that I, ROSCOE H. ALDRICH, a citizen of the United States, and a resident of Allentown, in the county of Lehigh and State of Pennsylvania, have invented a new and Improved Valve-Seat, of which the following is a full, clear, and exact description.

My invention relates to a valve seat particularly adaptable for valves used in pumps for circulating liquids containing abrasive matter in suspension.

An object of the invention is to provide a simple, inexpensive and efficient valve seat which is provided with means for maintaining the contacting or wearing surfaces of the seat clean from abrasive substances carried by the liquid which passes through the valve seat.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is a section through an inlet valve of a pump, the seat of which valve embodies my invention;

Fig. 2 is an enlarged section through the valve seat; and

Fig. 3 is a plan view of the valve seat.

Referring to the drawings, 5 is an annular valve seat, the end 6 forming the contact surface of the seat which is to be engaged by a yielding washer 7 of the valve 8. The valve seat 5 has an annular groove 9 on the outer periphery and an annular groove 10 on the contacting surface, the two grooves being in communication at suitable intervals by passage 11 formed in the body of the valve seat. The seat is also provided with an outer annular shoulder 12 located between the contacting surface and the annular groove 9. This shoulder forms a stop or an abutment for the seat when it is fitted into position into a body 13 which is to carry the seat.

The portion of the outer periphery of the valve seat below the shoulder is preferably tapered to fit tightly a corresponding taper in the body receiving it. The body 13 has a clean water supply 14 to the annular groove. The water is delivered to this annular groove at a pressure greater than the pressure against which the valve operates; consequently this clean water will prevent any material carried by the liquid pump from collecting on the contacting surface of the valve seat and thus prevent wear of the contacting surface.

Seats as described are particularly adaptable for pumps which carry liquids containing a large amount of sediment, such as sand, coal dirt, etc., and which sediment has a tendency to wear the contacting surface of the seat.

I claim:

An annular valve seat presenting a contacting surface at one end thereof having an annular groove depressed from said contacting surface, and an outer annular shoulder on the valve seat, said valve seat having its outer periphery tapering from the shoulder toward the other end of the valve, said valve seat having an annular groove on the tapering periphery thereof and passages establishing communication between the groove on the contacting surface to the groove on the periphery.

ROSCOE H. ALDRICH.